(No Model.)  2 Sheets—Sheet 1.
J. W. BROWN.
HARROW.
No. 518,912. Patented Apr. 24, 1894.
*Fig. I*
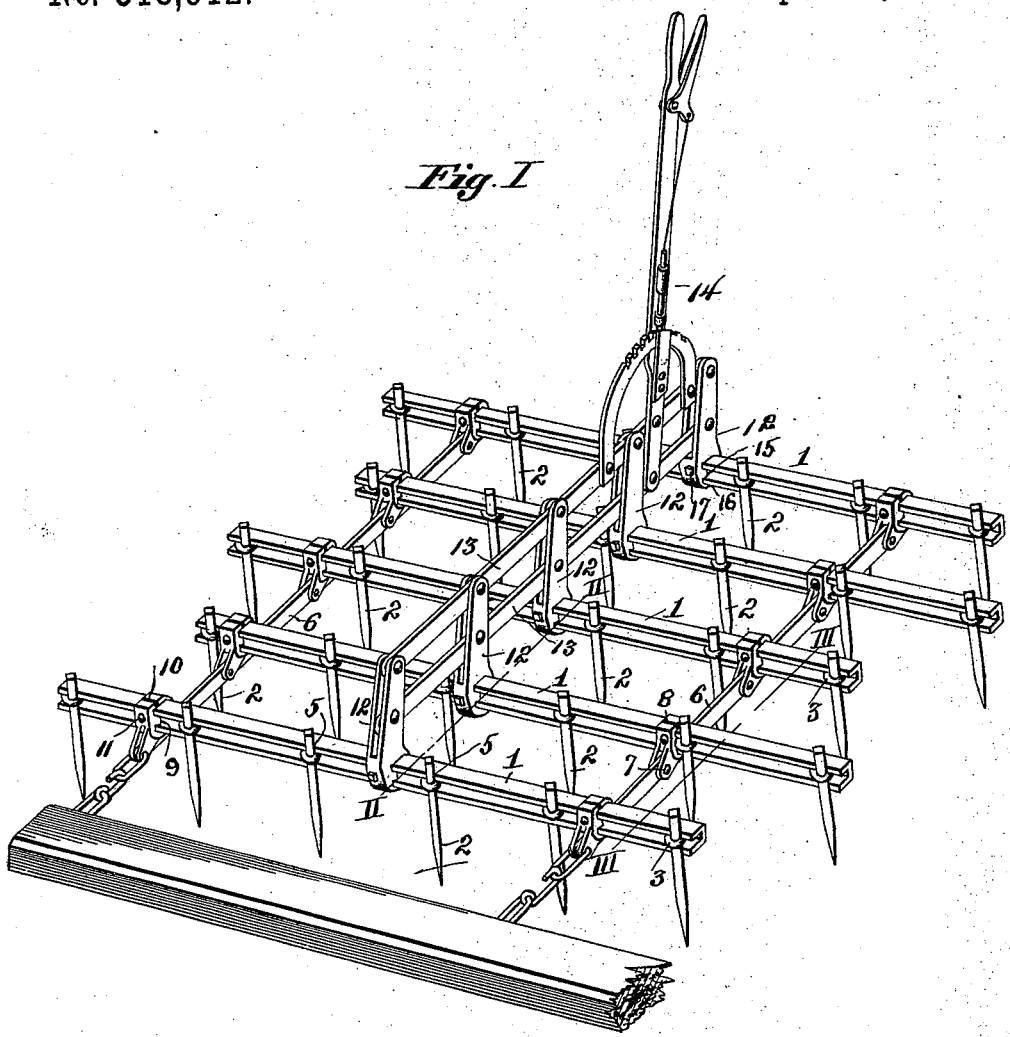
Attest:
A. M. Ebersole
G. E. Ebersole
Inventor:
Jno. W. Brown.
By Knight Bro.
Attys
THE NATIONAL LITHOGRAPHING COMPANY,
WASHINGTON, D. C.

(No Model.) 2 Sheets—Sheet 2.
J. W. BROWN.
HARROW.
No. 518,912. Patented Apr. 24, 1894.
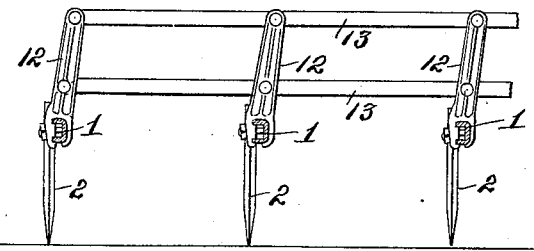
*Fig. II.*
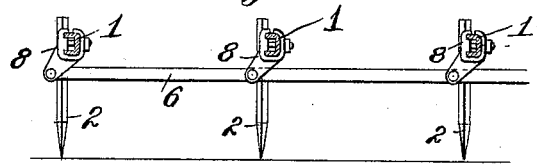
*Fig. III.*
*Fig. IV.*
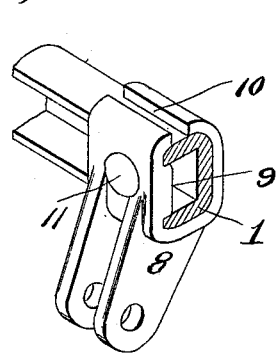
*Fig. VI.*
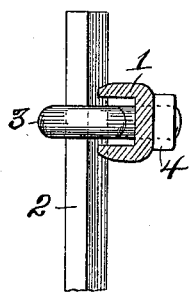
*Fig. V.*
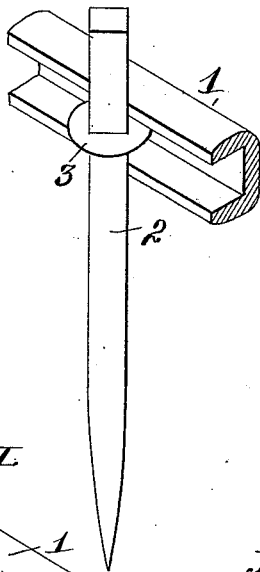
*Fig. VIII.*
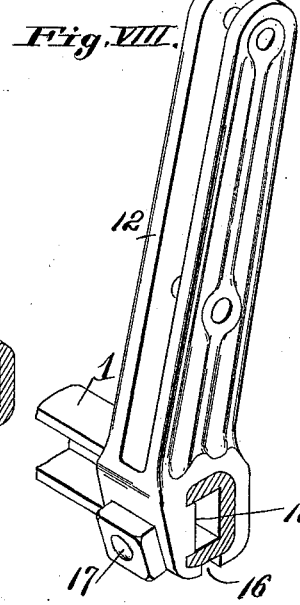
*Fig. VII.*
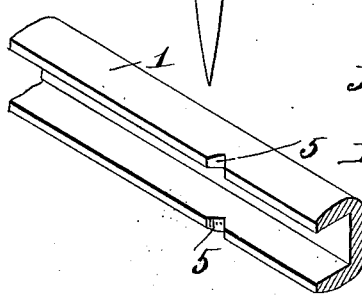
Attest:
A. W. Ebersole
G. E. Ebersole
Inventor,
Jno. W. Brown:
By Knight Bros
Attys

UNITED STATES PATENT OFFICE.

JOHN W. BROWN, OF QUINCY, ILLINOIS, ASSIGNOR TO THE COLLINS PLOW COMPANY, OF SAME PLACE.

HARROW.

SPECIFICATION forming part of Letters Patent No. 518,912, dated April 24, 1894.

Application filed September 25, 1893. Serial No. 486,416. (No model.)

*To all whom it may concern:*

Be it known that I, JOHN W. BROWN, of Quincy, in the county of Adams and State of Illinois, have invented a certain new and useful Improvement in Harrows, of which the following is a full, clear, and exact description, reference being had to the accompanying drawings, forming part of this specification.

My invention relates to certain improvements in metal harrows; and my invention consists in features of novelty hereinafter fully described and pointed out in the claims.

Figure I is a perspective view of my improved harrow. Fig. II is a detail section, taken on line II—II, Fig. I. Fig. III is a detail section, taken on line III—III, Fig. I. Fig. IV is an enlarged, perspective view, showing the manner of securing the connecting bar clips to the teeth bars. Fig. V is a perspective view, showing the manner of connecting the teeth to the bars. Fig. VI is an enlarged, transverse section of one of the bars, showing part of one of the teeth, and the connecting eye-bolt in section. Fig. VII is an enlarged, detail, perspective view of one of the teeth bars. Fig. VIII is an enlarged, perspective view, showing the manner of securing the rocking levers to the teeth bars.

Referring to the drawings, 1 represents the bars to which the teeth 2 are secured. The bars are U-shaped in cross-section, as clearly illustrated in the drawings, so as to form an upper and lower bearing for each tooth, on each side of a connecting eye-bolt 3, having angular or square eyes into which the angular or square shank of the tooth is slipped, and which is received by the channel of the U-shaped bar. The bolt passes through the back of the bar and receives a nut 4, by which the tooth is held firmly clamped in angular notches 5, formed in the bar. There is a pair of notches 5 for each tooth, and when the teeth are in place, and the nuts 4 firmly tightened, the teeth are held rigidly in place, and are not likely to be shifted in the use of the harrow. The different bars 1 are joined by a connecting bar 6, having pivotal connection 7 with clips 8, slipped over the bars 1. Each clip 8, as clearly shown in Fig. IV, is provided with a fillet or shoulder 9, fitting in the channel of the bars 1, providing slots for the edges of the bars, and each clip has a slot or opening 10, so as to permit the clip to be drawn tightly onto the bar by means of the connecting bolt or rivet 11. The fillet or shoulder 9 prevents any possibility of the clip slipping or turning on its bar 1.

12 represents levers projecting upwardly from the bars 1, and to which are connected the bars or strips 13, which are operated through means of a lever 14, to shift the bars 1 for the purpose of adjusting the pitch or angle of the teeth of the harrow. Each lever 12 is provided with a fillet or shoulder 15, fitting in the channels of the bars 1, and each lever is open, at 16, so as to permit it to be clamped firmly onto its bar by means of the connecting bolt or rivet 17. The fillets or shoulders 15 prevent the levers from turning or slipping on the bars in the use of the harrow.

My invention facilitates the rapid putting together of the harrow, and insures the firm and rigid connection of the teeth, clips and levers to the teeth bars.

I claim as my invention—

1. In a harrow, the combination of U-shaped bars, and clips 8, slotted at 10, and having fillets 9 fitting in the open sides of the bars and the bolts 11; substantially as and for the purpose set forth.

2. In a harrow, in combination with U-shaped bars, the levers 12 having fillets 15 and openings 16, and the bolts 17; substantially as and for the purpose set forth.

JOHN W. BROWN.

In presence of—
WM. N. BROWN,
E. S. THOMAS.